US007276171B2

(12) United States Patent
Kando et al.

(10) Patent No.: US 7,276,171 B2
(45) Date of Patent: Oct. 2, 2007

(54) METHOD FOR CLEANING SEPARATION MEMBRANE

(75) Inventors: Koichiro Kando, Handa (JP); Motoharu Noguchi, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/375,848

(22) Filed: Mar. 15, 2006

(65) Prior Publication Data
US 2006/0213833 A1 Sep. 28, 2006

(30) Foreign Application Priority Data
Mar. 24, 2005 (JP) .............................. 2005-085580
Feb. 21, 2006 (JP) .............................. 2006-043570

(51) Int. Cl.
*B01D 24/00* (2006.01)
(52) U.S. Cl. ................. 210/798; 210/321.69; 210/411; 210/108; 210/257.2
(58) Field of Classification Search ................ 210/791, 210/797, 798, 321.69, 411, 108, 257.2
See application file for complete search history.

(56) References Cited

U.S. PATENT DOCUMENTS

2004/0188361 A1 * 9/2004 Katsu et al. ................. 210/791
2005/0126963 A1 * 6/2005 Phagoo et al. ............... 210/110

FOREIGN PATENT DOCUMENTS

WO 00/30742 6/2000

OTHER PUBLICATIONS

Héran M et al., "Microfiltration through an inorganic tubular membrane with high frequency retrofiltration", Journal of Membrane Science, vol. 188, No. 2, Jul. 15, 2001, pp. 181-188.
Le-Clech P et al., "A comparison of submerged and sidestream tubular membrane bioreactor configurations", Desalination, vol. 173, No. 2, Mar. 10, 2005, pp. 113-122.

* cited by examiner

*Primary Examiner*—Chester T. Barry
(74) *Attorney, Agent, or Firm*—Burr & Brown

(57) ABSTRACT

When an out-of-basin type separation membrane, which is connected to a biological treatment tank through a circulation passageway for filtering tank water, is cleaned, a part or all of the backwash drainage containing the sludge peeled from the membrane surface is returned to the biological treatment tank through a backwash drain passageway or circulation passageway to maintain MLSS of the biological treatment tank constant. In the case of chemical cleaning, the sludge is peeled from the membrane surface by backwash with water, and the sludge is discharged out of the membrane module through a sludge line and then followed by chemical cleaning. Thus the need for using a large amount of a chemical solution is eliminated and the peeled sludge containing the chemical solution can be discharged out of the system as well, thereby preventing the microorganism from being damaged by the chemical solution.

3 Claims, 1 Drawing Sheet

METHOD FOR CLEANING SEPARATION MEMBRANE

BACKGROUND OF THE INVENTION

1. Field of the Invention

The present invention relates to a method for cleaning an out-of-basin type separation membrane for filtering tank water of a biological treatment tank with circulation.

2. Description of the Related Art

A biological treatment tank for decomposing organic substances and for nitrification and denitrification taking advantage of actions of microorganisms is widely used for the treatment of sewage, side streams, industrial waste water, leachate, night soil, agricultural waste water, livestock waste water and fish-breeding waste water or the like. Tank water in the biological treatment tank has been usually guided to a final sedimentation basin for solid-liquid separation by gravitational sedimentation, and sludge and supernatant are usually separated there with each other. However, since gravitational sedimentation requires a long retention time, a wide footprint is needed for the sedimentation basin. Accordingly, a separation membrane is often used as a solid-liquid separation means in sewage treatment plants constructed in urban areas where the site area is limited.

While the separation membrane is classified into an out-of-basin type and a submerged type, cleaning of the sludge adhered on the membrane surface is necessary in any of these two types. In particular, tank water in the biological treatment tank often contains a large amount of MLSS (Mixed Liquor Suspended Solid), the membrane is quickly plugged without appropriate cleaning of the membrane surface.

As disclosed in Japanese Patent Application Laid-Open (JP-A) No. 9-136021, the membrane surface of the submerged type separation membrane is continuously cleaned by introducing solid particles into the tank, allowing the surface of the separation membrane to contact with the solid particles by forming a circulating flow with air bubbles, and scratching away the sludge adhered on the surface of the membrane. However, since such circulation flow with air bubbles cannot be utilized in the out-of-basin type separation membrane, it is usually cleaned by backwash cleaning and chemical cleaning as is used in conventional separation membranes.

Usually, the separation membrane of the out-of-basin type is connected to the biological treatment tank through a circulation passageway, and tank water is filtered by a cross-flow method. Consequently, a raw water side of the separation membrane is connected to the biological treatment tank via the circulation passageway, and the sludge caused by allowing deposits to be peeled to the raw water side by applying a backwash pressure from a filtrate side is returned to the biological treatment tank as backwash drain through the backwash drain circulation passageway, or is returned to the biological treatment tank as backwash drain through the backwash drain circulation passageway together with the sludge remaining in the raw water side of the membrane after peeling. Since this is an operation necessary for maintaining MLSS (mixed liquor suspended solid) constant in the biological treatment tank, biological treatment ability of the biological treatment tank may be impaired when the backwash drain containing the peeled sludge is not returned.

So far, the peeled sludge has been returned to the biological treatment tank when the separation membrane is subjected to chemical cleaning as in backwash cleaning with water mentioned above. However, different from conventional separation membranes used for purifying water by filtration, a large amount of the sludge is deposited on the membrane surface of the out-of-basin type separation membrane for filtering tank water in the biological treatment tank by circulation. Accordingly, a large amount of chemicals are required for dissolving the sludge by conventional methods in which the separation membrane is immersed in a solution of chemicals, and backwash water containing a large amount of chemicals is returned to the biological treatment tank through the backwash water draining passageway or circulation passageway. Consequently, microorganisms in the biological treatment tank are damaged by the flowing-in chemical solution. A long time is required for resuming biological activity, and membrane filtration performance and treatment ability of the biological treatment tank may be deteriorated during the recovery time.

SUMMARY OF THE INVENTION

It is an object of the present invention to provide a method for cleaning a separation membrane of an out-of-basin type for filtering tank water in a biological treatment tank by filtration without using a large amount of chemicals, and without damaging microorganisms in the biological treatment tank.

The present invention provides a method for cleaning a separation membrane of an out-of-basin type for filtering tank water by circulation by connecting the membrane with a biological treatment tank through a circulation passageway, wherein a part or all of backwash drain containing sludge peeled from a membrane surface is returned to the biological treatment tank through a backwash drain passageway or circulation passageway in a usual backwash process with water, and wherein the sludge is peeled from the membrane surface by backwash with water to discharge the sludge out of a membrane module, followed by cleaning with chemicals, in a chemical cleaning process.

In a preferred embodiment, the biological treatment tank is an aeration tank for the treatment by activated sludge. The separation membrane may be a polymer membrane or a ceramic membrane. The membrane module means a vessel in which the membrane is inserted therein.

According to the method for cleaning the separation membrane of the present invention, MLSS of the biological treatment tank is not decreased, since a part or all of backwash drain containing sludge peeled from a membrane surface is returned to the biological treatment tank through a backwash drain passageway or circulation passageway in a usual backwash process with water. The sludge is peeled from the membrane surface by backwash with water to discharge the sludge out of a membrane module, followed by cleaning with chemicals, in a chemical cleaning process. Since the sludge is discharged out of the membrane module by peeling the sludge from the membrane surface in advance to chemical washing, the amount of the deposit remaining on the membrane surface is decreased to permit the required amount of the chemical to be reduced.

In addition, the sludge may be discharged out of the system as much as possible without recycling backwash water containing the chemicals as well as the sludge to the biological treatment tank in the succeeding chemical cleaning step. "Out of the system" as used herein refers to the system except the biological treatment tank and membrane filtration equipment. The destination of discharge of the sludge may be a sand sedimentation basin or a preliminary sedimentation basin. Microorganisms in the biological treatment are not adversely affected, since the sand sedimentation basin and preliminary sedimentation basin contains a substance for consuming the chemical in the sludge, and a sufficient retention time is ensured before water to be treated in the sand sedimentation basin and preliminary sedimentation basin flows into the biological treatment tank. Accordingly, microorganisms are less damaged by allowing backwash water containing a large amount of chemicals and the sludge to flow into the biological treatment tank, compared with the treatment by a conventional process.

DETAILED DESCRIPTION OF THE INVENTION

Figure 1:
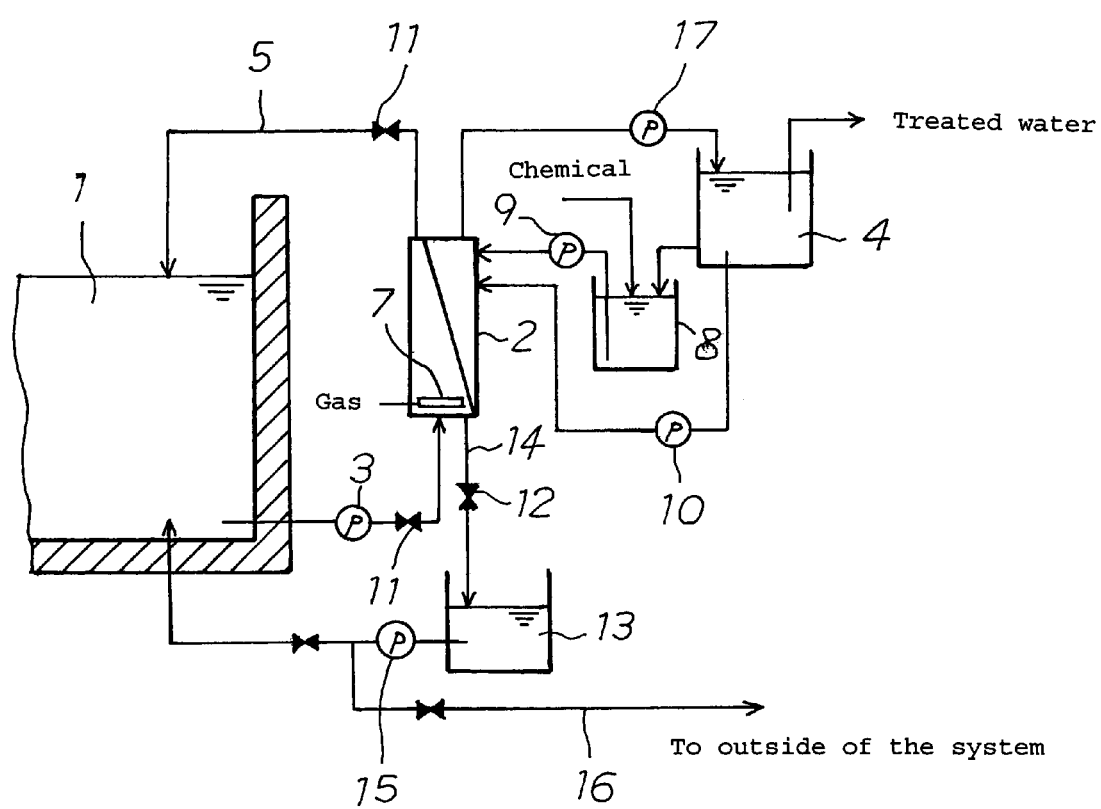
FIG. 1 is an explanatory diagram showing an embodiment of the present invention.

Preferred embodiments of the invention will be described below.

In FIG. 1, the reference numeral 1 denotes a biological treatment tank for treating drain of sewage. While examples of the biological treatment include, beside the activated sludge treatment process, a biological nitrogen-removal process(preanoxic/postanoxic), an AO process(anaerobic-aerobic process), and an $A_2O$ process (anaerobic-anoxic-aerobic process), the biological treatment tank 1 in this embodiment is an aeration tank for the activated sludge method, and aeration of water in the tank is conducted with an-equipment (not shown).

The reference numeral 2 denotes a separation membrane for filtering tank water in the biological treatment tank 1 with circulation. While the material of the separation membrane 2 is not restricted in the present invention, a polymer membrane or a ceramic membrane is preferably used. The configuration of the separation membrane 2 may be any shape such as a monolithic membrane, a tubular membrane and honeycomb membrane, and filtration may be performed by either an internal pressure or an external pressure method. The membrane preferably belongs to either an MF membrane or a UF membrane. Tank water in the biological treatment tank 1 is driven onto the separation membrane 2 by a circulation pump 3, and is filtered by a cross-flow filtration method. Filtered water is sent to a treated water tank 4, while tank water after passing through the separation membrane 2 is returned to the biological treatment tank 1 through a circulation passageway 5. While a filtration pump 17 is preferably provided between the separation membrane 2 and treated water tank 4 as shown in FIG. 1 for efficiently conducting membrane filtration, the filtration pump 17 may be omitted.

Since the separation membrane 2 filters tank water in the biological treatment tank 1 containing a large amount of SS, a large amount of sludge deposits on the membrane surface. Therefore, the membrane surface is cleaned by back wash with water and chemical cleaning when a differential pressure through the membrane is increased. Treatment water in the filtrate tank 4 is driven onto a filtrate side of the separation membrane 2 by means of a backwash pump 10 as in conventional backwashing, in order to peel the sludge deposited on the membrane surface to a raw water side. The peeled sludge is returned as the backwash drain water together with the sludge remaining in the raw water side of the membrane to the biological treatment tank 1 through a backwash water drainage passageway 14 or a circulation passageway 5 to consequently prevent MLSS in the biological treatment tank 1 from being decreased. Otherwise, treated water may be pooled in a pressurizing tank in place of using the backwash pump 10, and may be driven onto the filtrate side of the separation membrane as a pressurized liquid.

For backwashing, circulation is shut by closing a valve 11 of the circulation passageway, and a backwash drain valve 12 provided at a backwash drain passageway 14 connected to a backwash drain tank 13 is open to discharge the peeled sludge to the backwash drain tank 13 together with the sludge remaining at the raw water side of the membrane. The backwash drainage in the backwash drain tank 13 is returned to the biological treatment tank 1 by a backwash drain pump 15 to prevent MLSS in the biological treatment tank 1 from being decreased. The backwash drain tank 13 is not essential, and it is also possible to directly return the backwash drainage to the biological treatment tank 1 with the pump 10 or by a water level difference. A part of the backwash drainage in the backwash drain tank 13 may be discharged out of the system through a waste sludge line 16.

In the backwash step above, MLSS in the biological treatment tank 1 is preferably monitored so as to control so that the proportion of recycling of the sludge to the biological treatment tank 1 is reduced when the measured value tends to increase, or so that the proportion of returning of the sludge to the biological treatment tank 1 is increased when the measured value tends to decrease. All or a part of backwash drainage containing the peeled sludge and the sludge remaining in the raw water side of the membrane is returned to the biological treatment tank 1, and the residue is discharged out of the system.

For chemical cleaning, treated water in the filtrate tank 4 is driven onto the filtrate side of the separation membrane 2 by the backwash pump 10 for backwashing. The backwashing method is as described above. Then, the sludge is peeled from the membrane surface, and is discharged out of the membrane module from the circulation passageway or backwash drain tank 13, and from the waste sludge line 16. This operation permits the amount of the sludge deposited on the membrane surface to be reduced. Chemical cleaning follows this operation. For chemical cleaning, the circulation pump 3 is suspended, and then, the valve 11 is closed to shut the circulation passageway 5. Then the valve 12 is opened and treated water filtrate, to which chemicals such as sodium hypochlorite and others are added in a chemical bath 8, is driven from the filtrate water side of the separation membrane 2 through the cleaning pump 9. Then the valve 12 is closed and the membrane surface is immersed into the chemical solution to dissolve the sludge, and the sludge is peeled applying a pressure. A chemical solution using treated water may be pooled in a pressurized tank, and the solution may be driven onto the filtrate side of the separation membrane 2 as a pressurized chemical solution, instead of using a chemical cleaning pump 9.

In the step for dissolving the sludge by immersing the membrane surface in the chemical solution, it is preferable to supply a gas such as air from a gas supply means 7 provided at the raw water side of the separation membrane 2 in order to form a stream of a gas-liquid mixed phase at the raw water side of the separation membrane 2, because peeling of the sludge from the membrane surface may be enhanced by an agitation effect of the gas.

After finishing the cleaning step, the waste sludge valve 12 is closed, and usual filtration operation is resumed by opening the valve 11. Since the peeled sludge containing the chemical can be discharged out of the system through the waste sludge line 16 according to the present invention, microorganisms in the biological treatment tank 1 are not damaged, while the amount of use of the chemical can be reduced since the sludge is peeled from the membrane surface and discharged out of the membrane module by applying backwash in advance to chemical cleaning.

EXAMPLE

Using the apparatus shown in FIG. 1, tank water in an aeration tank in which the activated sludge treatment is conducted was filtered by a cross-flow method. The membrane used was a ceramic monolithic membrane (pore diameter 0.1 μm) manufactured by the applicant's company. The amount of circulation water was 1.0 m/s, the filtration flux was 2.0 m/d, air supply for backwashing was 0.11 m/s, backwash pressure was 500 kPa, and the amount of water used for backwashing was 3 L/m$^2$ per the unit of the membrane area.

When backwashing and chemical washing was applied at a cycle of 45 minutes in a conventional method, microorganism in the biological treatment tank 1 were damaged and membrane filtration performance immediately after chemical cleaning was reduced from 2.0 m/d to 1.2 m/d. However, according to the method of the present invention by which the sludge is peeled from the membrane surface by backwashing with the water to discharge the sludge out of the membrane module in advance to chemical cleaning followed by applying chemical cleaning, the treatment ability immediately after chemical cleaning was maintained at 2.0 m/d since the microorganisms were not damaged at all.

What is claimed is:

1. A method for cleaning a separation membrane of an out-of-basin type for filtering tank water with circulation, the method comprising the steps of:

connecting the separation membrane to a biological treatment tank through a circulation passageway;

connecting the separation membrane to a waste sludge line having a discharge location separate from the biological treatment tank, returning at least a portion of backwash drain containing sludge peeled from a surface of the separation membrane to the biological treatment tank through one of a backwash drain passageway and a circulation passageway in a backwash process with water;

peeling the sludge from the surface of the separation membrane by a backwash with water to discharge the sludge out of a membrane module containing the separation membrane;

cleaning the surface of the separation membrane with chemicals after the backwash with water; and discharging the chemicals and sludge removed by the chemicals through the waste sludge line to the discharge location separate from the biological treatment tank such that the chemicals are not introduced into the biological treatment tank.

2. The method for cleaning the separation membrane according to claim 1, wherein the biological treatment tank is an aeration tank for applying an activated sludge process.

3. The method for cleaning the separation membrane according to claim 1, wherein the separation membrane is one of a polymer membrane and a ceramic membrane.

* * * * *